United States Patent [19]

Funaki et al.

[11] Patent Number: 4,867,927
[45] Date of Patent: Sep. 19, 1989

[54] PROCESS OF PRODUCING THERMPLASTIC RESIN SHEET AND THE LIKE AND MOLDING SCREW THEREFOR

[75] Inventors: Akira Funaki; Toyokazu Takubo, both of Himeji, Japan

[73] Assignee: Idemitsu Petrochemical Co., Ltd., Tokyo, Japan

[21] Appl. No.: 152,533

[22] Filed: Feb. 5, 1988

[30] Foreign Application Priority Data

Feb. 13, 1987 [JP] Japan .................................. 62-31115
Feb. 13, 1987 [JP] Japan .................................. 62-31116

[51] Int. Cl.⁴ .............................................. B29C 47/60
[52] U.S. Cl. .............................. 264/180; 264/211.23;
264/237; 264/348; 264/349; 366/79; 366/88;
366/89; 366/90; 425/71; 425/203; 425/205;
425/208; 425/382.3
[58] Field of Search ..................... 264/211.20–211.24,
264/237, 349, 178–180, 176.1, 348;
425/203–209, 382.3, 71; 366/79, 88–90, 323,
343

[56] References Cited

U.S. PATENT DOCUMENTS

| 3,486,193 | 12/1969 | Gwinn et al. | 425/203 |
| 4,350,657 | 9/1982 | Jones et al. | 425/382.3 |
| 4,584,340 | 6/1971 | Koch | 425/207 |
| 4,666,649 | 5/1987 | Takubo et al. | 425/208 |
| 4,729,666 | 3/1988 | Takubo | 425/208 |

FOREIGN PATENT DOCUMENTS

| 43-10383 | 11/1963 | Japan | 425/205 |
| 60-21228 | 2/1985 | Japan | 425/208 |
| 61-211013 | 9/1986 | Japan | 425/203 |
| 62-410016 | 2/1987 | Japan . | |
| 62-146611 | 6/1987 | Japan . | |

Primary Examiner—Jeffery Thurlow
Attorney, Agent, or Firm—Flynn, Thiel, Boutell & Tanis

[57] ABSTRACT

This invention relates to a process of producing sheets from thermoplastic resins and a screw used therefor. The resin extruder includes a cylinder and the screw. The resin is passed through a feeding section, a compressing section, a metering section, a mixing section, a shearing section and a stress relaxing section, which are successively positioned from a resin feeding side to a resin extruding side, and a molten film-shaped resin is extruded, and this film-shaped resin is passed in a co-current direction with cooling water and is cooled.

15 Claims, 4 Drawing Sheets

PROCESS OF PRODUCING THERMPLASTIC RESIN SHEET AND THE LIKE AND MOLDING SCREW THEREFOR

BACKGROUND OF THE INVENTION

1. Field of the Invention

This invention relates to a process of producing a resin sheet or film from thermoplastic resins and to a molding screw therefor.

2. Description of the Prior Art

Crystalline thermoplastic resins such as polypropylene and polyethylene have been utilized in the various packaging fields and the like as sheets and containers due to their easiness in being thermoformed.

In producing the crystalline thermoplastic resin sheets as represented by polypropylene, as described above, to improve the transparency of these sheets, it has been practiced that the molten resin sheet be quenched to control the crystalline state. In a quenching process of this type, water cooling is the most efficient process. However, this process has a problem in that it is difficult to cool uniformly a molten film-shaped resin extruded from an extrusion die. The present applicant has proposed a process of using a multi-stage slit, through which cooling water flows down, as a process of uniform water-cooling the molten film-shaped resin (Japanese Patent Kokai (Laid-Open) No. 58-203018).

However, even if the cooling conditions are controlled, the cooling effect thereof is naturally limited, whereby the transparency, surface uniformity of the resin sheets as the molded items have not always been satisfactory.

As a result of various studies carried out by the inventors of the present invention, it was found that conditions of extrusion have a great influence at a stage of the molten film-shaped resin, where the molten film-shaped resin extruded has not yet come into contact with the cooling water, i.e. at a stage covering from the feeding the material to a resin extruder to the extruding of the material, and a process in which these extruding conditions are combined with a slit water cooling method, was proposed (Patent Kokai (Laid-Open) No. 62-146611 and Patent Application No. 61-202146).

Now, a construction of a screw is listed as one of important factors among the above-described extruding conditions.

Figure 1:
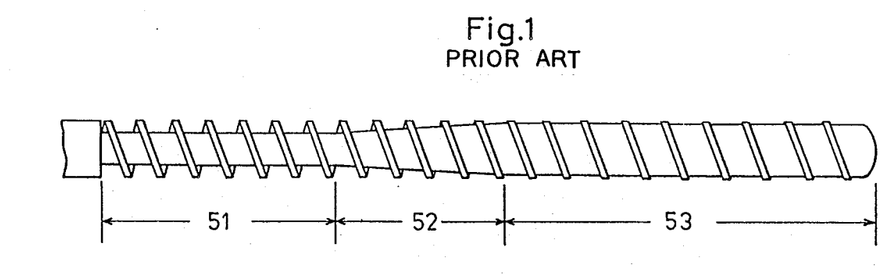
FIG. 1 is a side view showing the conventional common screw.

One of the commonest screws is shown in FIG. 1 for example. This screw, like a full-flighted metering screw, having a feeding section 51, a compressing section 52 and a metering section 53, which are positioned successively from a side of feeding resin to a side of extruding resin, has as its main purpose the increase in a compression ratio for satisfactory kneading of molten resin. Accordingly, although the kneading of the resin can be carried out relatively well, several problems have been presented because the compression ratio is high which is accompanied with high shearing. More specifically, the pressure deviation at the screw tip is remarkable at the time of high speed extrusion, so that molded items of high quality, excellent in accuracy of thickness and the like cannot be obtained stably. Furthermore, heat is generated due to the high shear rate, whereby the resin temperature is raised to an unncessarily high temperature, thus presenting such disadvantages the deteriorated resin leads to lowered physical properties of the molded items and take-up and sizing in the extrusion molding become difficult.

Because of this, there have been proposed a screw having a construction wherein the compression ratio is made relatively small and set at 1 as the case may be to thereby control occurrence of shearing heat, another construction of a screw of two-stage extrusion, wherein a shearing section is provided at the intermediate portion of the screw, and the like. However, in either of these cases, kneading became unsatisfactory, with the result that non-uniformity in resin temperature and dispersion failure of various additives took place, whereby it was difficult to obtain satisfactory molded items and the scope of applications was extremely limited. Particularly, with the screw of the two-stage extrusion, a shearing beyond need occurs at the intermediate shearing portion, and such problems are encountered that the resin is deteriorated due to raised resin temperature and difficulties in cooling and sizing due to the extrusion of the resin heated to high temperature.

Now, in order to solve these problems, the present applicant has proposed an extruder wherein the compressing section of the screw has a relatively low compression ratio, i.e. a moderate compressing section is provided (Patent Kokai (Laid-Open) No. 61-144322). A screw wherein the above-described one is further improved is proposed (Patent Kokai (Laid-Open) Nos. 62-41015 and 62-4101687).

However, in the screw provided at the intermediate portion thereof with the shearing section, in order to control the shearing heat at this shearing section at a low temperature, it becomes necessary to make the lengths of the feeding section and the compressing section satisfactorily long, which is not preferable. Even if these sections are lengthened, kneading in the shearing section is not satisfactorily when carrying out extrusion molding at high speed. As the case may be, a large quantity of unmolten resin flows into the shearing section, whereby fluctuations in an extrusion flow rate may take place and satisfactory molded items cannot be obtained, so that the extrusion molding cannot be carried out with high productivity, at high speed and stably.

SUMMARY OF THE INVENTION

One object of the present invention is to provide a process of producing resin sheets which have an improved transparency, and particularly a low surface haze, through high speed extrusion by combining extrusion molding, which uses an extruder set at specific conditions, with specific water cooling conditions.

Another object of the present invention is to provide a screw for the extrusion molding of thermoplastic resin, wherein satisfactory uniform kneading properties, high speed and stable extruding properties and low temperature extruding properties, which have heretofore been considered difficult to make compatible, are made possible.

A process of producing thermoplastic sheets according to the present invention features, by use of a resin extruder, including a cylinder and a screw which is provided with a first extruding section having a feeding section, a compressing section and a metering section, which are positioned successively from a resin feeding side to a resin extruding side, and which is further provided with a stage positioned rearwardly of the first extruding section, having a mixing section, a shearing section and a stress relaxing section, which are successively positioned, thermoplastic resin is extruded into a molten film-shaped resin, this molten film-shaped resin is introduced into a slit, through which cooling water flows down, and further, the film-shaped resin is made to run in the direction of flow of the cooling water and thereby cooled.

To achieve the above-described object, in short, the present invention contemplates a process wherein, based on the fact that the limit of the water cooling effect is closely associated with the extrusion conditions at the stage of resin extrusion molding, for example, a specific construction of a screw is adopted in the resin extruder, while, in a water cooler, resin is introduced into a slit to satisfactorily cool the resin, whereby the transparency of the resin sheets to be obtained are improved with a great stride.

To achieve the above-described object, the present invention contemplates a screw for molding thermoplastic resins, wherein a first extruding section is provided with a feeding section, a compressing section and a metering section, which are positioned successively from a resin feeding side to a resin extruding side. A mixing section, a shearing section and a stress relaxing section are successively provided from the first extruding section to the resin extruding side, whereby satisfactory kneading is carried out while the shear heat is controlled, and stable extrusion at high speed is made possible.

In the extruder used for the process according to the present invention, the aforesaid sections are constituted by a cylinder and a screw, and the screw for the extrusion is one as being a preferred single screw for use in the above-mentioned process.

DETAILED DESCRIPTION OF THE PREFERRED EMBODIMENT

One embodiment of the present invention will hereunder be described with reference to the accompanying drawings.

The thermoplastic resins usable in the present invention include polypropylene group resins such as, for example, a homo polymer of propylene, a random copolymer of propylene with another α-olefin of less than 20 weight%, and a blend of these. A blend obtainable by two-stage polymerization is also included in this blend. Other thermoplastic resins used in the present invention include crystalline resins such as high density polyethylene, low density polyethylene, linear low density polyethylene, polyester, polyamide, polyimide, polystyrene, polycarbonate, polyvinyl chloride, polyacrylonitrile, polyvinylidene chloride, polyphenylene oxide, polysulfone, polyphenylene sulfide and polyketone. Particularly, polypropylene group resins are used which are difficult to be molded into a sheet having excellent transparency. Further, the resin analogous to the above-described resins such as, for example, adherent resins such as graft-polyolefin maleic anhydride, easily welded resins such as a copolymer of ethylene-vinyl acetate, and gas barrier resins such as a copolymer of ethylene-vinyl alcohol, polyamide and polyethylene terephthalate, these polymers being applied in a multi-layer. In the case of the co-extruded multi-layer sheet, with polypropylene for example, the extruder according to the present invention is used for extruding a main component (normally, an outer layer resin) of the multi-layer sheet.

Figure 2:
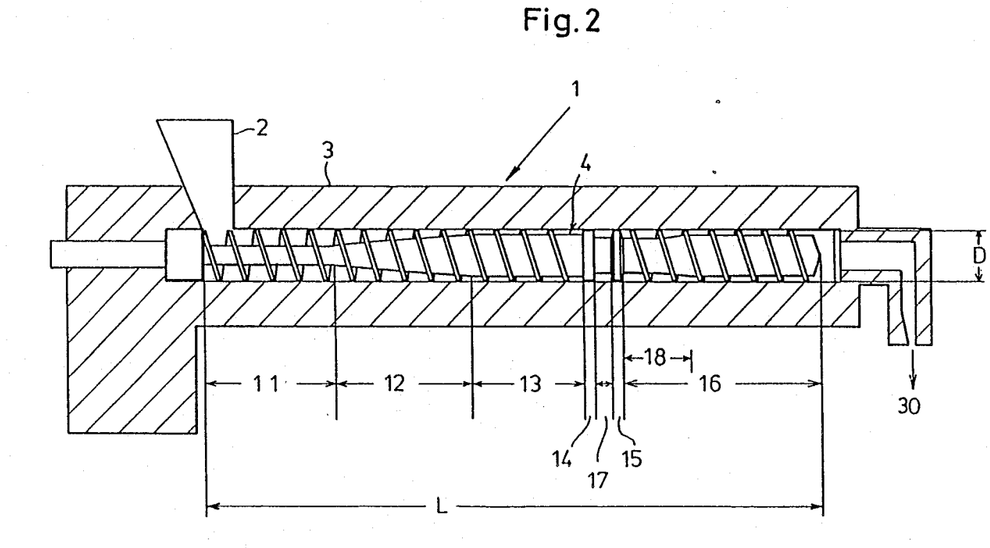
FIG. 2 is a section side view showing a resin extruder applied to the process of producing thermoplastic resin sheets according to the present invention.

FIG. 2 shows an extruder 1 used in this embodiment. This extruder 1 includes therein a cylinder or housing 3 provided with a hopper 2 for feeding resin pellets and a screw 4 installed in this cylinder 3.

In the screw 4, there is provided a first extruding section comprising a feeding section 11, a compressing section 12 and a metering section 13, which are positioned successively from a resin feeding side to a resin extruding side, and a mixing section 14, a shearing section 15 and a stress relaxing section 16, which are positioned rearwardly of the first extruding section.

In the feeding section 11, the resin pellets fed through the hopper 2 are delivered, while being heated, to the compressing section 12 by the propulsive force of the screw. Normally, the feeding section 11 has a given channel depth for a compression ratio of 1. Incidentally, grooves may be formed on the inner wall of the cylinder under the hopper throat. With this arrangement, a resin extrusion flow rate can be increased. In the compressing section 12, normally, the channel depth of the screw is made progressively smaller, whereby the resin is compressed while being fused and plasticated, and the compression ratio is 2-4 and preferably 2-3. If the compression ratio exceeds 4, then, the shearing stress in the terminating end portion of the compressing section 12 is increased, whereby raised resin temperature, break-up phenomenon and the like unfavorably take place. Next, the metering section 13 normally has a given channel depth and, when fusion is incomplete in the compressing section, fusion and plastication are facilitated therein. The metering section according to the present invention is relatively larger in channel depth than an ordinary one, the depth being 3-15 mm.

In the mixing section 14, the plasticated resin delivered from the metering section 13 is mixed, and the mixing section 14 has the function of dividing and breaking up an unmolten resin layer (solid bed) in the case of extrusion molding at high speed in particular. Here, the types of the mixing section 14 are not necessarily limited, and include a gear type, a dulmage screw, a reveresing screw with cuts, a multi-pin type and the like. The mixing section 14 has the main function of dividing and breaking up the unmolten resin layer. In the mixing section 14, the kneading action due to high shearing is relatively low and abnormal heating and the like of the rsin due to the shearing force do not occur. Especially, the gear type mixing section has many advantageous characteristic features that the construction is simplified, working can be easily made, the solid bed can be reliably divided and broken up and the shearing action is low. Incidentally, as the type of the gear is used in the mixing section, a spur gear is satisfactory, and, there is no particular limit on the type of spur gear and any type, such as a helical gear, may be adopted if the resin is divided when the resin is passed through the mixing section 14. Examples of specific numerical values when the spur gear type mixing section 14 is adopted will hereunder be described. The number of crests of the gear, the thickness of the gear, a clearance between the crest and the cylinder 3 and the like are different depending upon the type of the thermoplastic resin, molding conditions, the size of the screw (diameter=D) and the like, However, generally, the clearance between the crest of the gear and the cylinder 3 is set to 0.1-3 mm, and preferably 0.2-2.5 mm. It is disadvantageous that, when the clearance is less than 0.1 mm, the shearing action becomes high, and, when the clearance exceeds 3 mm, the dividing and break-up actions become disadvantageously weak. As for the thickness of the gear, it is sufficient if the thickness stays within a scope of (0.1-1)D and the thickness is less than 0.5 D from the viewpoint of the dividing action. Furthermore, the number of gears may be plural.

The resin mixed in the mixing section 14 is passed through a pressure releasing section 17 having a cylindrical shape and provided between the mixing section 14 and the shearing section 15 as necessary, and delivered to the shearing section 15 which has the function of uniformly fusing the molten resin and making the resin temperature uniform by shearing for a relatively short period of time. Here, as the shearing section 15, a torpedo, a sluice ring, a Maddock, a Torester and the like can be adopted. There is no particular limit imposed on adoption of these members, only if obstruction in the resin flow takes place due to the a small clearance between the shearing portion 15 and the cylinder 3, whereby the shearing becomes high. However, in general, the torpedo is favorably used from the viewpoint of simplified construction and good workability. Here, for the torpedo, the length thereof may be 0.05-2 times the diameter (D) of the screw and preferably 0.1 - 1 times the screw diameter. The clearance between the torpedo and the cylinder 3 may be 0.3-6 mm and preferably 0.5-4 mm. However, as these values, the most suitable ones may be selected in accordance with the combination of the size of screw, the length of torpedo and the clearance, and the type of resin, etc. These numerical values need not necessarily be adhered to. The pressure releasing section 17, in addition to its function as a connection in the construction between the mixing section 14 and the shearing section 15, has a function of facilitating the passage of resin through the shearing section because, if the resin passed through the mixing section 14 is immediately delivered to the shearing section 15, then, the passage of resin through the shearing section 15 tends to be difficult.

As described above in detail, the extruder 1 according to the present invention features the mixing section 14 of low shearing is especially provided before the shearing section 15, whereby the solid bed is divided and broken up, so that unmolten resin of a large quantity can be prevented from being transferred to the shearing section 15. Accordingly, the lengths of the feeding section 11, compressing section 12 and metering section 13 may be optionally determined in consideration of the type of resin and the like. However, according to the present invention, the provision of the mixing section 14 makes it possible to carry out the high speed molding with stability in extrusion without making the length of the screw to the metering section 13 relatively long.

Subsequently, the resin uniformly kneaded in the shearing section 15 is extruded into the stress relaxing section 16. In this case, the shearing stress due to the shearing remains, whereby, if the resin is extrusion-molded from a die as it is, then the surface characteristics of the resin is lowered due to a sharp stress relieving at the die outlet, so that sheets having excellent transparency, glossiness, etc. cannot be produced. Accordingly, in the extruder 1 according to the present invention, the resin passing through the shearing section 15 is extruded from the die after the remaining shearing stress is relaxed by the stress relaxing section 16 continuous to the shearing section 15. In this case, as the stress relaxing section 16, any extruding screw commonly used may be adopted. Most commonly, a screw having a metering effect is used. In an illustrated example, a pressure releasing section 18 having a deep channel is formed at a position close to the shearing section 15, and a rear stage of this releasing section has a given channel depth which is smaller in depth than in the former stage. The compression ratio of the screw in the region of the stress relaxing section 16 may be 3-0.5 and preferably 2.5-0.8. Particularly, to produce the sheets having satisfactory transparencies from crystalline resins such as polypropylene by quenching, it is preferable that a moderate compression type screw having a compression ratio of less than 1.5 is used to relax the remaining stress in the molten resin. More specifically, in common cases, new kneading is not necessary in this stress relaxing section 16. However, in order to disperse and make uniform an additive, a pigment agent and the like in the resin, a mixing section may be provided at the forward end portion of the stress relaxing section 16. In this stress relaxing section 16, metering of the molten resin (adjusting the discharge flow rate) is carried out, the shearing stress remaining in the molten resin is relaxed, and further, the uniform cooling of the molten resin is performed. The length of this stress relaxing section 16 differs depending on the construction, however, a length for satisfactorily achieving the relaxing, i.e. 4-20 times the diameter D of the screw is normally needed. The main purpose of this stress relaxing section 16 is to remove the remaining shearing stress and the stress relaxing section 16 has a construction in which high kneading and high shearing do not take place.

Figure 3:
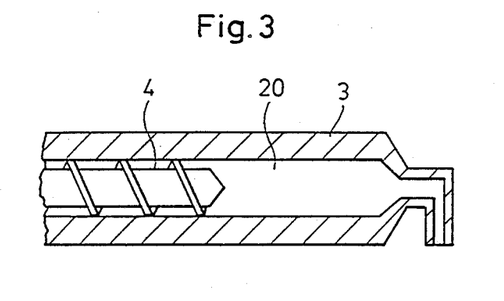
FIGS. 3 and 4 are sectional views showing examples of modifications of the stress relaxing section of the aforesaid extruder.
Figure 4:
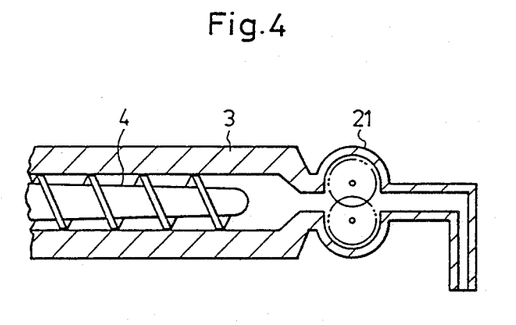

Additionally, the construction of a portion from the stress relaxing section 16 to the die may be the one shown in FIGS. 3 and 4 for example. The stress relaxing section shown in FIG. 3 is formed by a combination of the screw 4 and a non-screw portion 20 consisting of the cylinder 3 only. Further, as shown in FIG. 4, the provision of a gear pump 21 after the stress relaxing section or in the intermediate portion makes it possible at control the extrusion at a constant flow rate. In this specification, the description has been given to the most common single thread screw and constant pitch screw. However, a multiple-flighted screw, a partial multiple flighted screw, a variable pitch screw and the like may be adopted, and, as far as the effects of the present invention are retained, there is no limit imposed on these types of screws. The compression ratio means "(the channel depth at the resin flow-in end)/(the channel depth at the resin extruding end)" when the pitch of the screw is constant in each of the sections.

In the extruder 1, the ratio L/D between the total length L and the diameter D of the screw 4 is set at 15-40 and preferably 20-34. A groove in the axial direction may be formed on the inner wall of the cylinder 3 of the feeding section 11 (particularly, on a lines portion), so that the resin pellets can be smoothly fed.

In the above-described extruder 1, the resin fed into the cylinder 3 is passed through the feeding section 11, compressing section 12, metering section 13, mixing section 14, shearing section 15 and stress relaxing section 16, and extruded from the extrusion die. Incidentally, in the extruder 1 according to the present invention, it is more preferable to provide pressure releasing sections 17 and 18 on the respective resin extruding sides of the mixing section 14 and the shearing section 15.

Furthermore, in the extruder 1 according to the present invention, as the shearing section 15 thereof, instead of the torpedo provided on the side of the screw 4, a ring valve combined with the cylinder wall, i.e. a so-called shearing force adjustable ring valve may be adopted.

In this case, the resin pellets supplied are delivered under pressure to the compressing section 12, while being heated in the feeding section 11. In the compressing section 12, the resin pellets are fused and plasticated, and delivered under pressure to the metering section 13. In the metering section 13, fusion and plastication of the resin are facilitated, in the mixing section 14, the unmolten resin layer (solid bed) is divided and broken up, the unmolten resin of a large quantity (30% or more) is prevented from being transferred to the shearing section 15, the resin is further melted uniformly in the shearing section 15, and the resin temperature is made uniform. Subsequently, the molten resin thus made uniform is delivered under pressure to the stress relaxing section 16, where the remaining shearing stress in the resin is relaxed and the resin is cooled and made uniform, and thereafter, extruded from the die as a molten film-shaped resin.

Figure 5:
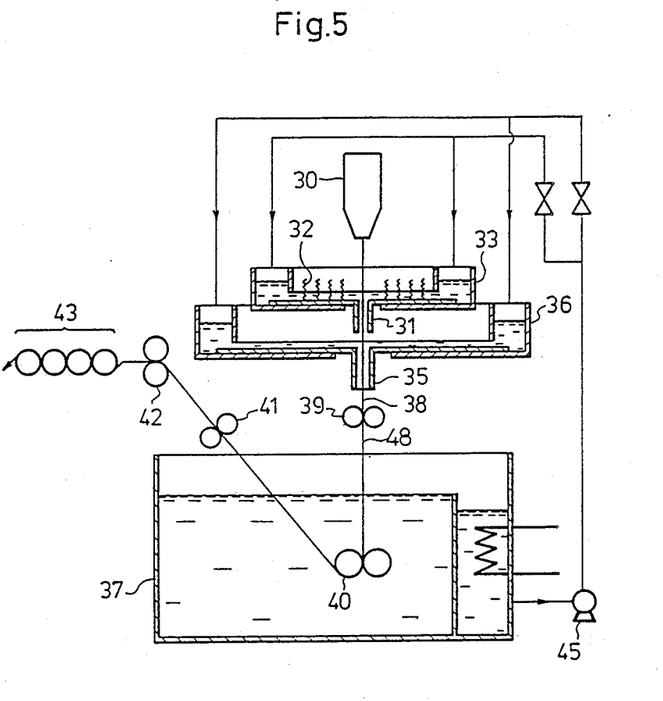
FIG. 5 is a sectional view showing a slit cooling device to which to the present invention is applied.

FIG. 5 shows a slit cooling device for cooling the molten film-shaped resin extruded from the extruder 1. This slit cooling device corresponds to the device of the aforesaid proposed Patent Application Kokai (laid-open) No. 62-146611 and is positioned downwardly of a die 30 provided with the extruder 1 for realizing the aforesaid extrusion. This slit cooling device includes: a top stage water tank 33 having a slit 31, through which the cooling water flows down, and porous flow regulating members 32 for regulating the flow of cooling water; a bottom stage water tank 36 positioned at a stage downwardly of the top stage water tank 33 and having a slit 35 positioned immediately beneath the slit 31; a water tank 37 positioned further downwardly of this bottom stage water tank 36; clamping rolls 39 and 40 for clamping the extruded molten film-shaped resin 38 under pressure to maintain the running speed of the molten film-shaped resin at a constant value; rolls 41 and 42 for taking up the film-shaped resin 48 passed through the water tank 37; a group of rolls 43 for heat-treating the film-shaped resin 48 in a predetermined manner; and a pump 45 for circulating the cooling water, which has flowed down through the water tank 37 to be cooled, through the top stage water tank 33 and the bottom stage water tank 36.

In the slit cooling device, the molten film-shaped resin 38 extruded from the extrusion die 30 is introduced into the slits 31 and 35 of the top stage water tank 33 and the bottom stage water tank 36, through which the cooling water flows down, passed through the cooling water in the water tank 37 through the clamping rolls 39 and 40, taken up by the take-up rolls 41 and 42, and thereafter, heat-treated in a predetermined manner by the group of rolls 43 as necessary, to thereby complete the molding of the resin sheet. In this case, the flow-down speed of the cooling water from the slits 31 and 35 is made larger than the running speed of the film-shaped resin 48, whereby the quantity of the cooling water being in contact with the film-shaped resin 48 is increased, so that the cooling effect can be improved. Incidentally, it is preferable that the cooling water should be prevented from stagnating at the inlet of the slit 31 when the cooling water flows into the top stage slit 31. For this purpose, the water level in the top stage water tank 33 needs to be held low. Here, if the stagnation occurs, then, nonuniform cooling of the molten resin film-shaped material 38 takes place due to the rise in temperature of the cooling water, so that sheets having low haze on the outer surface cannot be obtained.

A specific example based on the process of producing the thermoplastic resin sheets according to the present invention will hereunder be described.

EXAMPLE 1

The raw material resin was homopolypropylene (density: $0.91/cm^2$, MI(Melt-Index): 8g/10min, melting point: 170° C., manufactured by Idemitsu Petrochemical Co., Ltd., trade name: Idemitsu Polypro F-700N). This resin was extruded from a T-die into a film by the use of a extruder having the following screw under the conditions of a resin temperature of 250° C. and a die lip temperature of 280° C.

| Screw | |
|---|---|
| Diameter | D = 65 mm, L/D = 28 |
| Feeding section | Length = 325 mm |
| | Channel depth = 10 mm, constant |
| Compressing section | Length = 520 mm |
| | Channel depth = 10 → 4.5 mm (progressively decreased) |
| Metering section | Length = 345 mm |
| | Channel depth = 4.5 mm, constant |
| Mixing section | (15 tooth crests, a spur gear having a tooth height of 3.7 mm, an open area = 70% [open area/(cylinder's sectional area)-(sectional area of tooth root diameter) × 100] Length = 20 mm Clearance from cylinder = 1.3 mm |
| Pressure releasing section (cylindrical shape) | Length = 65 mm Clearance from cylinder = 5 mm |
| Shearing section (torpedo) | Length = 15 mm Clearance from cylinder = 2 mm |
| Stress relaxing section | Length = 530 mm Channel depth = 5 mm, constant |

*A groove was formed on the inner wall of the cylinder positioned downwardly of the hopper.

Subsequently, the molten film-shaped resin was introduced into the slit cooling device shown in FIG. 5 (the top stage slit 31 had a height of 50 mm and a width of 2.5 mm, the top stage water tank 33 had a water level of 5 mm, the water temperature thereof was 5° C., the flow regulating members 32 used had four stages each consisting of doubled metal screens of 60 mesh, the bottom stage slit 35 had a height of 10 mm and a width of 5 mm, the bottom stage water tank 36 had a water level of 10 mm and the water temperature thereof was 5° C.), where the molten film-shaped resin was quenched, and the film-shaped resin was molded by the clamping rolls 39 and 40, whereby a polypropylene sheet having a thickness of 0.2 mm was obtained. Further, this sheet was heat-treated by use of the group of rolls 43 at 130° C.

In the manufacture of this sheet, when the maximum extrusion flow rate whose wall thickness accuracy in the flowing direction of the obtained sheet remained within a range of ±5% was searched, it was 116 kg/h at the screw revolution of 100r.p.m., and 93.1 kg/h at 80 r.p.m. The hazes of the obtained sheet were 4.1% and 3.7% at the respective rotary speeds described above, and the glossinesses were 124% and 129%, respectively.

COMPARATIVE EXAMPLE 1

The same screw was used as in Example 1, except that the mixing section was not provided and the length of the metering section was set to 365 mm, a sheet was molded in accordance with Example 1. The maximum stable extrusion flow rate was 84.5 kg/h at 80 r.p.m.

COMPARATIVE EXAMPLE 2

The same screw was used as in Example 1, except that the metering section was not provided, the length of the feeding section was set to 500 mm and the length of the compressing section was set to 690 mm, a sheet was molded in accordance with Example 1. The maximum stable extrusion flow rate was 79.1 kg/h at 80 r.p.m.

From the above-described specific Example and Comparative Examples, it is understood that, in producing a polypropylene sheet having excellent transparency, when the extruder according to the present invention is used, the sheet can be molded at high speed, and, in comparison to the same rotary speeds, the extrusion flow rate of the extruder according to the present invention is more than 10% higher than others and excellent from the viewpoint of the energy consumption.

EXAMPLES 2, 3, & COMPARATIVE EXAMPLES 3, 4

By use of the screw having the shape shown in Table 1 (the diameter is 50 mm, the ratio between the total length L and the diameter D is $L/D=26$) and a die having a diameter of 25 mm or a T-die of 500 mm × 1.5 mm, polypropylene (trade name: Idemitsu Polypro F-200S, MI(Melt-Index): 2g/10min, manufactured by Idemitsu Petrochemical Co., Ltd.) was extrusion molded under the temperature conditions of 250° C. in both the cylinder and the die, and the molding properties and the extruded products were evaluated.

TABLE 1

UNIT mm

| | FEEDING SECTION | | COMPRESSING SECTION | | METERING SECTION | | MIXING SECTION*1 | | CYLINDRICAL SECTION | | SHEARING*2 SECTION | | 2ND EXTRUDING SECTION | |
|---|---|---|---|---|---|---|---|---|---|---|---|---|---|---|
| | LENGTH | CHANNEL DEPTH | LENGTH | CHANNEL DEPTH*3 | LENGTH | CHANNEL DEPTH | LENGTH | CLEAR-ANCE | LENGTH | CLEAR-ANCE | LENGTH | CLEAR-ANCE | LENGTH | CHANNEL DEPTH |
| EXAMPLE 2 | 250 | 8 | 400 | 8→4 | 250 | 4 | 15 | 1 | 50 | 4 | 10 | 1 | 300 | 4 |
| EXAMPLE*4 | 250 | 8 | 400 | 8→4 | 250 | 4 | 15 | 1 | 50 | 4 | 10 | 1 | 100 | 6 |
| | | | | | | | | | | | | | 200 | 4 |
| COMPARATIVE EXAMPLE 3 | 250 | 8 | 400 | 8→4 | 265 | 4 | — | — | 50 | 4 | 10 | 1 | 300 | 4 |
| COMPARATIVE EXAMPLE 4 | 450 | 8 | 450 | 8→4 | — | — | 15 | 1 | 50 | 4 | 10 | 1 | 300 | 4 |

*1 15 tooth crests, A spur gear having a tooth height of 3 mm, An open area = 70% [Open area/(Cylinder's sectional area)=(Sectional area of tooth root diameter × 100]
*2 Torpedo
*3 Groove depth is progressively decreased from feeding section's side to metering section's side
*4 2nd extruding section has two-stage in channel depth The results are shown in Table 2.

TABLE 2

| USED SCREW | R.P.M. | FLUCTUATION IN PRESSURE IN DIE PORTION (kg/cm$^2$) | PRESIN TEMPERATURE AT DIE OUTLET | EXTRUSION FLOW RATE (kg/h) | MAXIMUM STABLE EXTRUSION FLOW RATE (kg/h) | TRANSPARENCY | UNIFORMITY |
|---|---|---|---|---|---|---|---|
| EXAMPLE 2 | 150 | ±1.9 | 234 | 53.0 | 71.0 | ◉ | ◉ |
|  | 210 | ±3.0 | 236 | 71.0 |  |  |  |
| EXAMPLE 3 | 150 | ±1.5 | 234 | 53.5 | 71.5 | ◉ | ◉ |
|  | 210 | ±2.6 | 234 | 71.5 |  |  |  |
| COMPARATIVE EXAMPLE 3 | 150 | ±3.6 | 245 | 47.5 | 55.5 | ◉ | ○ |
|  | 210 | ±5.0 | 249 | 64.0 |  |  |  |
| COMPARATIVE EXAMPLE 4 | 150 | ±3.9 | 239 | 43.0 | 52.0 | ◉ | ◉ |
|  | 210 | ±5.2 | 242 | 61.0 |  |  |  |

*Back pressure 100 kg/cm$^2$
*Maximum stable extrusion flow rate: Less than ±5% of wall thickness accuracy in flowing direction
*Transparency & Uniformity: By use of another die having lip width × Lip gap = 500 mm × 1.5 mm,
◉= Excellent, ○= Good As is apparent from Table 2, when a comparison is made at the same r.p.m., the Examples of the present invention are superior with respect to deviation in pressure at the die portion and the resin temperature to the Comparative Examples at the die outlet. Furthermore, in the Examples, the stable extrusion flow rates are improved to a great extent.

As has been described hereinabove, by adoption of an extruder capable of carrying out the optimal extrusion and the specified water cooling method, in the manufacture of the crystalline thermoplastic resin such as polypropylene, which has heretofore been difficult to manufacture, sheets having excellent transparency can be produced. Moreover, even if the extrusion flow rate is increased 30–40% higher than the conventional process, sheets having satisfactory sheet thickness accuracy in the flowing direction can be produced, thus offering the advantages that the extruding power can be reduced, the productivity is improved and the sheets can be manufactured inexpensively. Moreover, improved kneading properties, low temperature extrusion molding and stable high-speed extrusion molding which have been considered incompatible in the past, can be achieved.

What is claimed is:

1. A process for the production of a thermoplastic resin sheet comprising the steps of introducing a thermoplastic resin into a resin extruder, said resin extruder comprising a housing and a screw contained therein, said screw having a first extruding stage comprisisng a feeding section, a compressing section and a metering section provided successively from where said thermoplastic resin is introduced into said screw, said screw also having a mixing section in which at least one spur gear is provided, said spur gear having a clearance between a crest of said gear and said housing of from 0.1—3 mm and a thickness of from 0.1-1 times the diameter D of said screw, said screw additionally having a first pressure releasing section, a shearing section and a stress relaxing section provided successively after said first extruding stage, said stress relaxing section having a second pressure releasing section provided adjacent said shearing section; extruding a molten thermoplastic film from said resin extruder; introducing said thermoplastic film into a slit in a cooling device, said slit having cooling water flowing therethrough in a co-current direction with said thermoplastic film; and recovering a thermoplastic resin sheet.

2. A process of producing thermoplastic resin sheet as set forth in claim 1, wherein said cooling water flowing through the slit flows down in such a manner that said cooling water does not substantially stagnate at the inlet of the slit.

3. A process of producing thermoplastic resin sheet as set forth in claim 1, wherein said thermoplastic resin is a polypropylene group resin.

4. A process of producing thermoplastic resin sheet as set forth in claim 1, wherein said slit is of a multi-stage type.

5. A process of producing thermoplastic resin sheet as set forth in claim 1, wherein the flow speed of said cooling water is larger than the running speed of said film-shaped resin.

6. A process of producing thermoplastic resin sheet as set forth in claim 1, wherein said stress relaxing section is constituted by a combination of the screw and a non-screw portion consisting of the housing.

7. A process of producing thermoplastic resin sheet as set forth in claim 1, wherein said stress relaxing section is provided at a rear stage thereof with a gear pump which allows a constant extrusion flow rate.

8. A screw for molding a thermoplastic resin comprising a first extruding stage comprising a feeding section, a compressing section and a metering section provided successively from where said thermoplastic resin is introduced into said screw; said screw also having a mixing section in which at least one spur gear is provided, said spur gear having a clearance between a crest of said gear and a housing in which said screw is contained of from 0.1-3 mm and a thickness of from 0.1-1 times the diameter D of said screw; and said screw additionally having a first pressure releasing section, a shearing section and a stress relaxing section provided successively after said first extruding stage, said stress relaxing section having a second pressure releasing section provided adjacent said shearing section.

9. A screw for molding thermoplastic resin as set forth in claim 8, wherein said shearing section is of a torpedo type.

10. A screw for molding thermoplastic resin as set forth in claim 8, wherein the compression ratio of said compressing section is from 2-4.

11. A screw for molding thermoplastic resin as set forth in claim 10, wherein the compression ratio of said compressing section is from 2-4.

12. A screw for molding thermoplastic resin as set forth in claim 8, wherein a cylindrical pressure releasing section is interposed between said mixing section and said shearing section.

13. A screw for molding thermoplastic resin as set forth in claim 8, the compression ratio of said stress relaxing section is from 3-0.5.

14. A screw for molding thermoplastic resin as set forth in claim 13, wherein the compression ratio of said stress relaxing section is from 2.5-0.8.

15. A screw for molding thermoplastic resin as set forth in claim 8, wherein the length of said stress relaxing section is from 4-20 times the diameter of said screw.

* * * * *